United States Patent
Gurevich et al.

(10) Patent No.: US 11,710,008 B1
(45) Date of Patent: Jul. 25, 2023

(54) METHODS AND APPARATUS FOR LOCATING SMALL INDICIA IN LARGE IMAGES

(71) Applicant: ZEBRA TECHNOLOGIES CORPORATION, Lincolnshire, IL (US)

(72) Inventors: Vladimir Gurevich, Great Neck, NY (US); Carl D. Wittenberg, Water Mill, NY (US); Thomas Lackemann, Sayville, NY (US); Dayou Wang, Mount Sinai, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/573,575

(22) Filed: Jan. 11, 2022

(51) Int. Cl.
*G06K 7/14* (2006.01)
*G06T 7/11* (2017.01)

(52) U.S. Cl.
CPC .............. *G06K 7/1417* (2013.01); *G06T 7/11* (2017.01); *G06K 2207/1011* (2013.01)

(58) Field of Classification Search
CPC . G06K 7/1417; G06K 2207/1011; G06T 7/11
See application file for complete search history.

(56) References Cited

U.S. PATENT DOCUMENTS

2012/0031962 A1\* 2/2012 Li .......................... G06K 7/14
235/375

\* cited by examiner

*Primary Examiner* — Matthew Mikels
(74) *Attorney, Agent, or Firm* — Yuri Astvatsaturov

(57) ABSTRACT

Methods and apparatus for locating small indicia in large images are disclosed herein. An example method includes: identifying an aiming pattern zone that includes a detected or presumed location of an aiming light pattern, wherein an offset between the location and a center of image data varies due to a parallax; determining one or more coordinates of the aiming pattern zone; capturing image data representing an image of an environment appearing within a field of view (FOV) of a handheld scanner including the indicia; encoding the one or more coordinates into a tagline of the image; and providing the image with the tagline to an indicia decoder such that the indicia decoder attempts to decode the indicia from the image data starting in a region of the image data selected based upon the one or more coordinates.

21 Claims, 5 Drawing Sheets

METHODS AND APPARATUS FOR LOCATING SMALL INDICIA IN LARGE IMAGES

BACKGROUND

With the advent of high-resolution, auto-focus, long-range handheld scanners, the decoding of indicia that are far away from a handheld scanner may not be limited by the sharpness of the indicia in an image, but rather by the ability of an indicia decoder to locate the indicia in the image. For example, a reduced-height one-dimensional (1D) barcode or a low-density two-dimensional (2D) barcode printed on a large item may appear extremely small in an image captured at the end of a handheld scanner's focus range because the indicia is represented by only a few pixels of a large image. The decoding of such small indicia may become slow or inconsistent and, under some circumstances, may even fail to decode an indicia.

SUMMARY

To reduce or eliminate some or all of these, or other problems of conventional indicia decoding, example methods, apparatuses and articles of manufacture for locating and decoding small indicia in large images are disclosed.

In an embodiment, a method for locating an indicia includes: identifying an aiming pattern zone that includes a detected or presumed location of an aiming light pattern, wherein an offset between the detected or presumed location of the aiming light pattern and a center of image data varies with a distance from a handheld scanner to the indicia due to a parallax; determining one or more coordinates of the aiming pattern zone; capturing, with an image sensor of the handheld scanner, image data representing an image of an environment appearing within a field of view (FOV) of the handheld scanner including the indicia; encoding the one or more coordinates of the aiming pattern zone into a tagline of the image; and providing the image with the tagline to an indicia decoder such that the indicia decoder attempts to decode the indicia from the image data starting in a region of the image data selected based upon the one or more coordinates of the aiming pattern zone.

In a variation of this embodiment, the one or more coordinates of the aiming pattern zone represent a location of a corner or a center of the aiming pattern zone.

In a variation of this embodiment, the method further includes determining a focus distance based upon the identified aiming pattern zone; and controlling one or more focusing components to focus the handheld scanner at the focus distance, wherein the image data is captured while the handheld scanner is focused at the focus distance.

In a variation of this embodiment, the aiming pattern zone is identified by: energizing an aiming light source to provide the aiming light pattern; capturing, with the image sensor while the aiming light source is energized, first image data representing a first partial image of only a portion of an environment appearing within the FOV, wherein the aiming light pattern moves within the portion of the environment in response to a change in a distance from the handheld scanner to the indicia; dividing the first image data into a first plurality of sub-images; totaling brightnesses of the first image data in each of the first plurality of sub-images to form a first plurality of total brightnesses for respective ones of the first plurality of sub-images; de-energizing the aiming light source; capturing, with the image sensor while the aiming light source is de-energized, second image data representing a second partial image of only a portion of an environment appearing within the FOV; dividing the second image data into a second plurality of sub-images; totaling brightnesses of the additional image data in each of the second plurality of sub-images to form a second plurality of total brightnesses for respective ones of the second plurality of sub-images; computing a plurality of differences between respective ones of the first plurality of total brightnesses and the second plurality of total brightnesses; and identifying a first sub-image of the first plurality of sub-images corresponding to a largest respective difference of the plurality of differences as the aiming pattern zone.

In a variation of this embodiment, the first sub-image is identified as the aiming pattern zone when the largest difference satisfies a criteria.

In a variation of this embodiment, the aiming pattern zone is identified by: energizing an aiming light source to provide the aiming light pattern; capturing, with the image sensor while the aiming light source is energized, first image data representing a first image of the environment appearing within the FOV; applying one or more image processing algorithms to the first image data to detect the aiming light pattern; and identifying a zone of the first image data including the detected aiming light pattern as the aiming pattern zone.

In a variation of this embodiment, the aiming pattern zone is identified by: determining a focus distance; controlling one or more focusing components to focus the handheld scanner at the focus distance, wherein the image data is captured while the handheld scanner is focused at the focus distance; identifying, based upon the focus distance and the parallax, the presumed location of the aiming light pattern; and identifying the aiming pattern zone to include the presumed location of the aiming light pattern.

In a variation of this embodiment, the focus distance is at least one of determined according to a pre-determined focus ramp.

In a variation of this embodiment, when the indicia is not decodable in the image data, the method further includes: determining a second focus distance; controlling the one or more focusing components to focus the handheld scanner at the second focus distance; capturing, with the image sensor while handheld scanner is focused at the second focus distance, additional image data representing an additional image of the environment appearing within the FOV; identifying, based upon the second focus distance and the parallax, a second presumed location of the aiming light pattern; identifying a second aiming pattern zone based upon the second presumed location of the aiming light pattern; determining one or more coordinates of the second aiming pattern zone; encoding the one or more coordinates of the second aiming pattern zone into a tagline of the additional image; and providing the additional image to the indicia decoder such that the indicia decoder attempts to decode the indicia from the additional image data starting in a region of the additional image data selected based upon the one or more coordinates of the second aiming pattern zone.

In another embodiment, a handheld scanner includes an image sensor, an aiming light source, and processor. The processor configured to: identify an aiming pattern zone that includes a detected or presumed location of an aiming light pattern, wherein an offset between the detected or presumed location of the aiming light pattern and a center of the image data varies with a distance from the handheld scanner to an indicia due to a parallax; determine one or more coordinates of the aiming pattern zone; cause the image sensor to capture image data representing an image of an environment appearing within a field of view (FOV) of the handheld scanner that includes the indicia; encode the one or more coordinates of the aiming pattern zone into a tagline of the image; and provide the image with the tagline to an indicia decoder separate from the handheld scanner, wherein the indicia decoder is configured to, in response to receiving the image, attempt to decode the indicia from the image data starting in a region of the image data selected based upon the one or more coordinates of the aiming pattern zone encoded in the tagline.

In a variation of this embodiment, the one or more coordinates of the aiming pattern zone represent a location of a corner or a center of the aiming pattern zone.

In a variation of this embodiment, the handheld scanner includes one or more focusing components to focus the handheld scanner, and the processor is further configured to: determine a focus distance based upon the identified aiming pattern zone; and control the one or more focusing components to focus the handheld scanner at the focus distance, wherein the image data is captured while the handheld scanner is focused at the focus distance.

In a variation of this embodiment, the processor is configured to identify the aiming pattern zone by: energizing the aiming light source to provide the aiming light pattern; causing the image sensor to, while the aiming light source is energized, capture first image data representing a first partial image of only a portion of an environment appearing within the FOV, wherein the aiming light pattern moves within the portion of the environment in response to a change in a distance from the handheld scanner to the indicia; dividing the first image data into a first plurality of sub-images; totaling brightnesses of the first image data in each of the first plurality of sub-images to form a first plurality of total brightnesses for respective ones of the first plurality of sub-images; de-energizing the aiming light source; causing the image sensor to, while the aiming assembly is de-energized, capture second image data representing a second partial image of only a portion of an environment appearing within the FOV; dividing the additional image data into a second plurality of sub-images; totaling brightnesses of the additional image data in each of the second plurality of sub-images to form a second plurality of total brightnesses for respective ones of the second plurality of sub-images; computing a plurality of differences between respective ones of the first plurality of total brightnesses and the second plurality of total brightnesses; and identifying a first sub-image of the first plurality of sub-images corresponding to a largest respective difference of the plurality of differences as the aiming pattern zone.

In a variation of this embodiment, the processor is configured to identify the aiming pattern zone by: determining a focus distance; identifying, based upon the focus distance and the parallax, the presumed location of the aiming light pattern; and identifying the aiming pattern zone to include the presumed location of the aiming light pattern.

In a variation of this embodiment, the processor is configured to identify the aiming pattern zone by: energizing an aiming light source to provide the aiming light pattern; capturing, with the image sensor while the aiming light source is energized, first image data representing a first image of the environment appearing within the FOV; applying one or more image processing algorithms to the first image data to detect the aiming light pattern; and identifying a zone of the first image data including the detected aiming light pattern as the aiming pattern zone.

In yet another embodiment, a non-transitory, computer-readable, storage medium stores computer-readable instructions that, when executed by one or more processors, cause a handheld scanner to: identify an aiming pattern zone that includes a detected or a presumed location of an aiming light pattern, wherein an offset between the detected or presumed location of the aiming light pattern and a center of image data varies with a distance from the handheld scanner to an indicia due to a parallax; determine one or more coordinates of the aiming pattern zone; cause the image sensor to capture image data representing an image of an environment appearing within a field of view (FOV) of the handheld scanner that includes the indicia; encode the one or more coordinates of the aiming pattern zone into a tagline of the image; and provide the image with the tagline to an indicia decoder separate from the handheld scanner to cause the indicia decoder to attempt to decode the indicia from the image data starting in a region of the image data selected based upon the one or more coordinates of the aiming pattern zone.

In a variation of this embodiment, the one or more coordinates of the aiming pattern zone represent a location of a corner or a center of the aiming pattern zone.

In a variation of this embodiment, the instructions, when executed by the one or more processors, cause the handheld scanner to: determine a focus distance based upon the identified aiming pattern zone; and control one or more focusing components to focus the handheld scanner at the focus distance, wherein the image data is captured while the handheld scanner is focused at the focus distance.

In a variation of this embodiment, the instructions, when executed by the one or more processors, cause the handheld scanner to identify the aiming pattern zone by: energizing an aiming light source to provide the aiming light pattern; cause the image sensor to, while the aiming light source is energized, capture first image data representing a first partial image of only a portion of an environment appearing within the FOV, and wherein the aiming light pattern moves within the portion of the environment in response to a change in a distance from the handheld scanner to the indicia; dividing the first image data into a first plurality of sub-images; totaling brightnesses of the first image data in each of the first plurality of sub-images to form a first plurality of total brightnesses for respective ones of the first plurality of sub-images; de-energizing the aiming light source; cause the image sensor to capture, while the aiming assembly is de-energized, second image data representing a second partial image of only a portion of an environment appearing within the FOV; dividing the second image data into a second plurality of sub-images; totaling brightnesses of the second image data in each of the second plurality of sub-images to form a second plurality of total brightnesses for respective ones of the second plurality of sub-images; computing a plurality of differences between respective ones of the first plurality of total brightnesses and the second plurality of total brightnesses; and identifying a first sub-image of the first plurality of sub-images corresponding to a largest respective difference of the plurality of differences as the aiming pattern zone.

In a variation of this embodiment, the instructions, when executed by the one or more processors, cause the handheld scanner to identify the aiming pattern zone by: determining a focus distance; identifying, based upon the focus distance and the parallax, the presumed location of the aiming light pattern; and identifying the aiming pattern zone to include the presumed location of the aiming light pattern.

In a variation of this embodiment, the instructions, when executed by the one or more processors, cause the handheld scanner to identify the aiming pattern zone by: energizing an aiming light source to provide the aiming light pattern;

capturing, with the image sensor while the aiming light source is energized, first image data representing a first image of the environment appearing within the FOV; applying one or more image processing algorithms to the first image data to detect the aiming light pattern; and identifying a zone of the first image data including the detected aiming light pattern as the aiming pattern zone.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
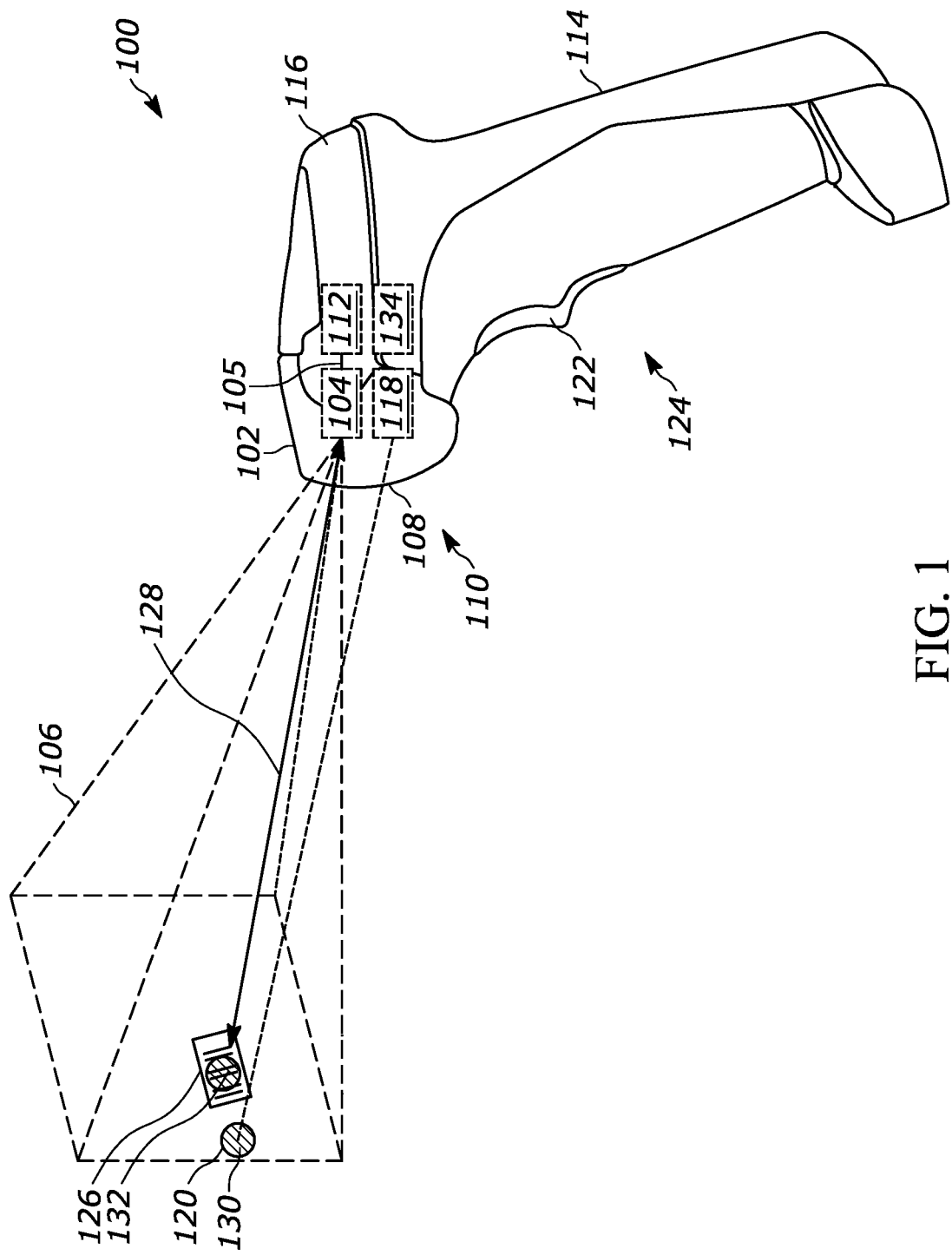
FIG. 1 is a perspective view of an example handheld scanner, in accordance with embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Reference will now be made in detail to non-limiting examples, some of which are illustrated in the accompanying drawings.

FIG. 1 illustrates an example handheld scanner 100 configured to, among possibly other things, scan, locate, and decode indicia, such as a 1D barcode, a 2D barcode, a direct product marking (DPM), or the like. The handheld scanner 100 may be, for example, a handheld barcode reader. While examples disclosed herein refer to a handheld scanner 100 operated in a handheld mode, the examples disclosed herein may be used when a handheld scanner is placed in a cradle and operated in a handsfree mode, with a bioptic scanner, with a slot scanner, etc.

The example handheld scanner 100 includes an example housing 102 in which an image sensor 104 is disposed. The image sensor 104 captures image data 105 representing an image of an environment in an imaging field of view (FOV) 106 of the handheld scanner 100 that passes through a front-facing, light-transmissive window or opening 108 on a front side 110 of the handheld scanner 100. For example, the image data 105 may represent an image of an object on which an indicia is printed, inscribed, affixed, or the like. For example, a 1D barcode, a 2D barcode, a DPM, or the like may be printed, inscribed, or affixed to a package, a box, a piece of paper, a part, etc. The handheld scanner 100 includes an indicia decoder 112 in communication with the image sensor 104, and configured to receive the image data 105, and locate and decode one or more indicia captured in the image data 105. An example indicia decoder 112 is a barcode decoder.

The example housing 102 of FIG. 1 includes a generally elongated handle or lower handgrip portion 114, and an upper body portion 116 having the front side 110 at which the window or opening 108 is located. The cross-sectional dimensions and overall size of the handgrip portion 114 are such that the handheld scanner 100 can be conveniently held in a user's hand. The window or opening 108 is configured to face generally away from a user when the user has the handheld scanner 100 in a handheld position. The portions 114 and 116 may be constructed of a lightweight, resilient, shock-resistant, self-supporting material, such as a synthetic plastic material. The housing 102 may be injection molded, but can also be vacuum-formed or blow-molded to form a thin hollow shell which bounds an interior space whose volume is sufficient to contain the various components of the handheld scanner 100. Although the housing 102 is illustrated as a portable, point-of-transaction, gun-shaped, handheld housing, any other configuration including a handsfree configuration could be used.

The handheld scanner 100 includes an example aiming light source 118 disposed in the housing 102, and configured to provide an aiming light pattern, such as an aiming light spot 120. In use, a user orients the handheld scanner 100 such that the aiming light spot 120 falls incident on an indicia within the FOV 106, and then actuates a trigger 122 to cause the image sensor 104 to capture image data 105 representing an image that includes the indicia. The operator may depress the trigger 122 with one or more fingers. Example indicia include a 1D barcode, a 2D barcode, a DPM indicia, or the like. The trigger 122 is mounted in a moving relationship on the handgrip portion 114 in a forward facing region 124 of the handgrip portion 114.

The aiming light source 118 is positioned physically apart from the image sensor 104, in the implementation shown, such that the aiming light spot 120 moves within the FOV 106 as the handheld scanner 100 is moved towards or away from an indicia 126, due to parallax. As a distance 128 between the handheld scanner 100 and the indicia 126 increases from a near distance to a far distance, the aiming light spot 120 corresponding moves across the FOV 106 from a first location 130 near an edge of the FOV 106 to a second location 132 closer to a center of the FOV 106. A location of the aiming light spot 120 in the image data 105 representing an image of the FOV 106 can be detected and used to determine the distance 128. The detected location of the aiming light spot 120 in the image data 105 can be used to determine a focus distance to the indicia 126 such that the handheld scanner 100 can be focused on the indicia 126.

When a user, as instructed, orients the handheld scanner 100 such that the aiming light spot 120 falls incident on the indicia 126 to be decoded, and then actuates the trigger 122 to cause the image sensor 104 to capture image data 105 representing an image that includes the indicia 126, the detected location of the aiming light spot 120 in the image data 105 may also be used by the indicia decoder 112 to select an initial region of the image data 105 in which the indicia decoder 112 initially searches for and attempts to decode the indicia 126. By thus detecting and using the location of the aiming light spot 120 in the image data 105 to locate the indicia 126, the time it takes the indicia decoder 112 to locate and decode the indicia 126 can be substantially reduced and, under some circumstances, may prevent the indicia decoder 112 from failing to locate and decode the indicia 126.

The handheld scanner 100 may detect the location of the aiming light spot 120 by: (i) capturing first image data 105 representing a first image of an environment in the FOV 106 while the aiming light source 118 is active or energized; (ii) capturing second image data 105 representing a second image of an environment in the FOV 106 while the aiming light source 118 is inactive or de-energized; and (iii) using one or more differences between the first image data 105 and the second image data 105 to detect the aiming light spot 120 and determine the location of the aiming light spot 120 in the first image data 105. In some examples, the first image data 105 and the second image data 105 represent an environment in only a portion (e.g., a strip) of the FOV 106 in which the aiming light spot 120 moves in response to the distance 128 changing to increase image frame rate and/or to reduce the amount of image data 105 that has to be processed to detect and locate the indicia 126.

The handheld scanner 100 quantizes the focus distance 128 to a pre-determined finite set of fixed focus distances to increase auto-focus speed, in some examples. In such examples, the location of the aiming light spot 120 only needs to be detected relative to a finite set of aiming spot zones. The aiming spot zones correspond to respective ones of the finite set of fixed focus distances. As the distance 128 changes, the aiming light spot 120 moves between aiming spot zones.

Figure 2:
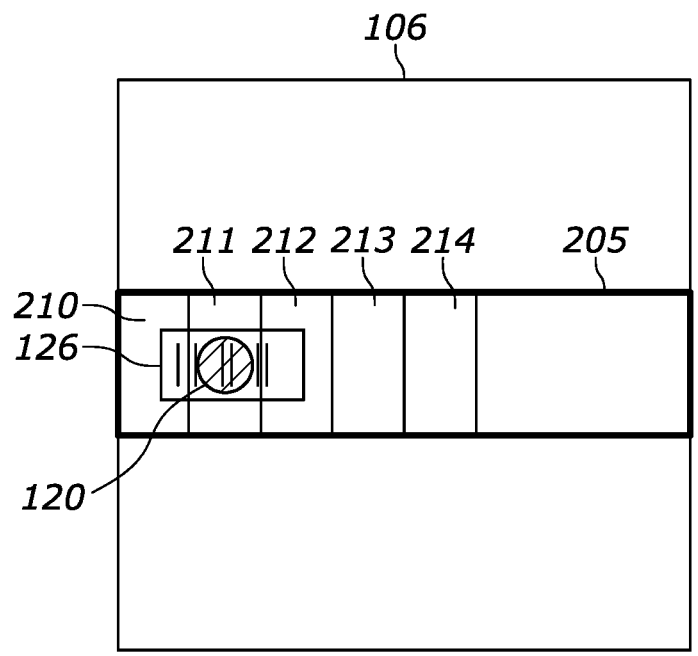
FIG. 2 is an example image that may be captured using the example handheld scanner of FIG. 1.

FIG. 2 is an example image 205 captured using the example handheld scanner 100 while handheld scanner 100 is a first distance 128 from the indicia 126. In the example shown, the image 205 corresponds to only a portion of the FOV 106 of the handheld scanner 100. The image 205 may be divided into a plurality of sub-images 210, 211, 212, 213 and 214 corresponding to respective ones of a plurality of aiming spot zones in which the aiming light spot 120 may be located. The aiming spot zones correspond to respective ones of a plurality of fixed focus distances. Because a user, as instructed, orients the handheld scanner 100 such that the aiming light spot 120 overlaps the indicia 126, as shown, the location of the aiming light spot 120 in image data 105 corresponding to the image 205 can be used to identify the location of the indicia 126 in the FOV 106 and, thus, in image data 105 representing an image of a larger portion of the FOV 106.

Figure 3:
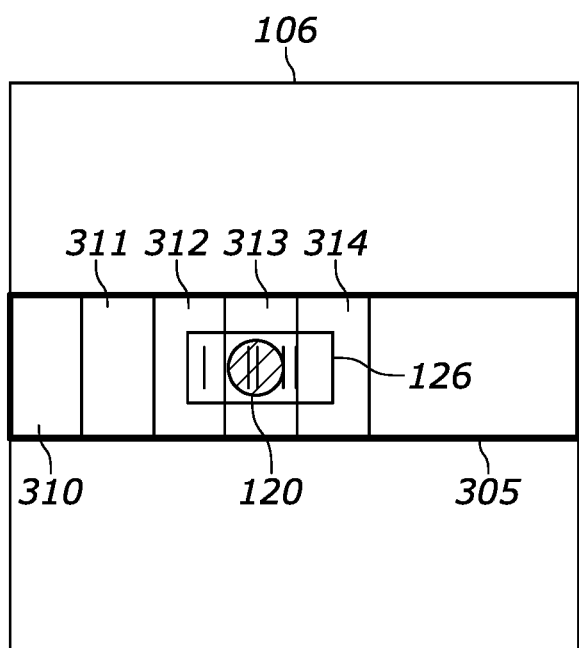
FIG. 3 is another example image that may be captured using the example handheld scanner of FIG. 1.

FIG. 3 is another example image 305 captured using the example handheld scanner 100 while the handheld scanner 100 is a second greater distance 128 from the indicia 126. The image 305 may likewise be divided into a plurality of sub-images 310, 311, 312, 313 and 314 corresponding to respective ones of a plurality of aiming spot zones in which the aiming light spot 120 may be located, which correspond to respective ones of a plurality of fixed focus distances. Because a user, as instructed, orients the handheld scanner 100 such that the aiming light spot 120 overlaps the indicia 126, as shown, the location of the aiming light spot 120 in image data 105 corresponding to the image 305 can again be used to identify the location of the indicia 126 in the FOV 106 and, thus, in image data 105 representing an image of a larger portion of the FOV 106.

The handheld scanner 100 may detect the location of the aiming light spot 120 by capturing first image data 105 representing a first image of an environment in the FOV 106 while the aiming light source 118 is active or energized, and capturing second image data 105 representing a second image of an environment in the FOV 106 while the aiming light source 118 is inactive or de-energized. For example, the first image data 105 may represent the image 205 while the aiming light source 118 is active or energized, and the second image data 105 may represent the image 205 while the aiming light source 118 is inactive or de-energized. The first image data 105 may be divided into a first plurality of sub-images (e.g., the sub-images 210-214) corresponding to a finite set of aiming spot zones, with a first plurality of total brightnesses computed for respective ones of the first plurality sub-images. The second image data 105 may be likewise divided into a second plurality of sub-images (e.g., the sub-images 210-214) corresponding to the finite set of aiming spot zones, with a second plurality of total brightnesses computed for respective ones of the second plurality sub-images. Differences between the first and second pluralities of total brightnesses may be computed and used to detect the sub-image having the largest difference as the aiming spot zone in which the aiming light spot 120 is located. The identified aiming spot zone in which the aiming light spot 120 is detected may be used to: (i) determine a focus distance to an indicia 126; (ii) control one or more focusing components to focus the handheld scanner 100 at the focus distance; (iii) capture image data 105 representing an image of an environment in the FOV 106 while focused at the focus distance; and (iv) select a region of the image data 105 based on one or more coordinates of the identified aiming spot zone in which to start attempting to decode the indicia 126.

In some examples, the one or more coordinates of the identified aiming spot zone represent a center or a corner of the aiming spot zone. The one or more coordinates of the identified aiming spot zone may be encoded into a tagline of an image passed to the indicia decoder 112 for decoding, such that the indicia decoder 112 attempts to decode the indicia 126 in image data 105 of the image starting in a region of the image data 105 selected based upon the one or more coordinates of the aiming spot zone encoded in the tagline. When the identified aiming spot zone is identified by a first device (e.g., the handheld scanner 100) while the indicia decoder 112 is implemented by a second device (e.g., a host device) only the image with the encoded tagline needs to be passed to the indicia decoder 112. However, the one or more coordinates could be provided to the indicia decoder 112 separate from the image. Any additional images used to identify the aiming spot zone (e.g., as described below in connection with FIG. 6) are only needed and processed by the first device, and need not be passed to the second device implementing the indicia decoder 112. In this way, the amount of image data that is passed to the indicia decoder 112 by the handheld scanner 100 can be substantially reduced, and overall responsiveness of a system including the handheld scanner 100 and the host device substantially increased. In some examples, the dimensions of the region in which decoding starts are selected based upon an expected barcode size at a current focus distance, and the location of the region is selected to be centered on the identified aiming spot zone.

In some examples, an aiming light spot is detected and an aiming spot zone is identified when a total brightness difference satisfies a pre-determined threshold. When an aiming light spot is not, thus, detected, the handheld scanner 100 may sequentially attempt to decode an indicia using a finite sequence of fixed focus distances. At each focus distance, the handheld scanner 100: (i) focusses at the current focus distance; (ii) identifies a presumed aiming light zone in which an aiming light spot is presumed to be located for the current focus distance; and (iii) selects a region of image data 105 based on one or more coordinates of the presumed aiming spot zone in which to start attempting to decode the indicia 126.

In some examples, the handheld scanner 100 is calibrated during manufacture to accommodate, possibly among other tolerances, a tolerance in the separation between the image sensor 104 and the aiming light source 118 and/or a tolerance in an optical alignment of the image sensor 104 and the aiming light source 118. Such manufacturing tolerances affect the amount of and/or the geometry of parallax between the image sensor 104 and the aiming light source 118. Accordingly, the handheld scanner 100 stores a calibration table 134 representing the coordinates of each aiming spot zone or, equivalently, each sub-image corresponding to respective ones of a finite plurality of fixed focus distances. The coordinates of each aiming spot stored in the calibration table 134 can be used to define the sub-images into which image data 105 is divided for detecting the location of the aiming light spot 120. Conversely, when an aiming light spot 120 is not detected and various fixed focus distance are tried, the coordinates of a presumed aiming spot for a current focus distance can be determined using the calibration table 134 based on the parallax geometry between the image sensor 104 and the aiming light source 118.

Figure 4:
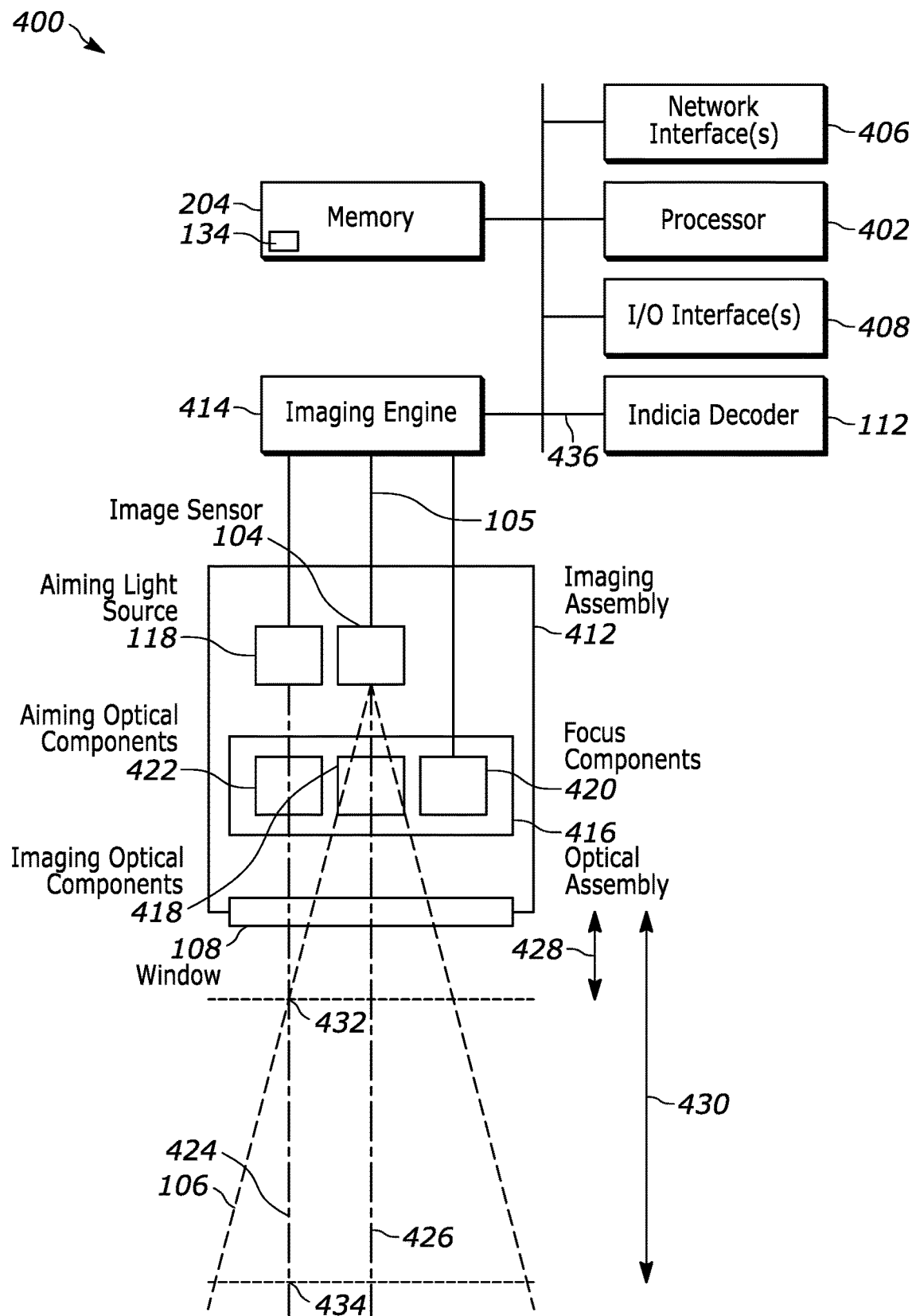
FIG. 4 is a block diagram of an example logic circuit for implementing the example handheld scanner of FIG. 1 and/or the example methods and/or operations described herein.

FIG. 4 is a block diagram representative of an example logic circuit that may be used to implement, for example, the handheld scanner 100 of FIG. 1. The example logic circuit of FIG. 4 may be configured to capture images, locate indicia in images, and decode indicia, according to embodiments disclosed herein. The logic circuit may be disposed in the example housing 102 of FIG. 1.

The example logic circuit of FIG. 4 is a processing platform 400 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 400 includes a processor 402 such as, for example, one or more microprocessors, controllers, and/or any suitable type of processor. The processing platform 400 includes memory (e.g., volatile memory, non-volatile memory) 404 accessible by the processor 402 (e.g., via a memory controller not shown for clarity of illustration). The memory 404 may be used to store, among other things, the calibration table 134 of FIG. 1. The example processor 402 interacts with the memory 404 to obtain, for example, machine-readable instructions stored in the memory 404 corresponding to, for example, the operations represented by the flowchart(s) of this disclosure. Additionally or alternatively, machine-readable instructions corresponding to the example operations described herein may be stored on one or more removable media (e.g., a compact disc (CD), a digital versatile disc (DVD), removable flash memory, etc.) that may be coupled to the processing platform 400 to provide access to the machine-readable instructions stored thereon. The processor 402 is configured to, among possibly other things, execute the machine-readable instructions to control one or more operations of the handheld scanner 100 including capturing images, locating indicia in images, and decoding indicia.

The example processing platform 400 includes one or more communication interfaces such as, for example, one or more network interfaces 406, and/or one or more input/output (I/O) interfaces 408. The communication interface(s) may enable the processing platform 400 to communicate with, for example, another device, system, host system (e.g., an inventory management system, a point-of-sale (POS) station, a point-of-transaction station, etc.), datastore, database, and/or any other machine.

The example processing platform 400 may include the network interface(s) 406 to enable communication with other machines (e.g., an inventory management system, a POS station, a point-of-transaction station, etc.) via, for example, one or more networks. The example network interface(s) 406 include any suitable type of communication interface(s) (e.g., wired and/or wireless interfaces) configured to operate in accordance with any suitable communication protocol(s). Example network interfaces 406 include a TCP/IP interface, a WiFi™ transceiver (e.g., according to the IEEE 802.11x family of standards), an Ethernet transceiver, a cellular network radio, a satellite network radio, or any other suitable interface based on any other suitable communication protocols or standards.

The example, processing platform 400 of FIG. 4 may include the input/output (I/O) interface(s) 408 (e.g., a Bluetooth® interface, a near-field communication (NFC) interface, a universal serial bus (USB) interface, a serial interface, an infrared interface, etc.) to: (1) enable receipt of user input (e.g., from the trigger 122 of FIG. 1, a touch screen, keyboard, mouse, touch pad, joystick, trackball, microphone, button, etc.); (2) communicate output data (e.g., visual indicators, instructions, data, images, etc.) to the user (e.g., via an output device such as a speaker, printer, haptic device, etc.); and/or (3) interact with other components of the handheld scanner 100.

To capture image data 105 representing images of objects and/or indicia on objects, the example processing platform 400 includes an example imaging assembly 412. The imaging assembly 412 includes the image sensor 104 under control of, for example, an imaging engine 414 to capture image data 105 representing image of an environment in which the handheld scanner 100 is operating that falls within the FOV 106 of the imaging assembly 412. The image sensor 104 includes a plurality of photosensitive elements forming a substantially flat surface. While not illustrated for clarity of illustration, the processor 402 may be communicatively coupled to components of the imaging assembly 412 and/or, more generally, the imaging engine 414 via the input/output (I/O) interface(s) 408.

The example imaging assembly 412 includes any number and/or type(s) indicia decoders 112 (e.g., a barcode decoder) to detect and/or decode indicia to determine the payload of the indicia. In some examples, the indicia decoder 112 is implemented by the processor 402. The indicia decoder 112, e.g., via the processor 402, conveys the payload of decoded indicia to a host system via a communication interface such as the network interface(s) 406 and/or the I/O interface(s) 408. Alternatively, the indicia decoder 112 could be implemented by the host system separate from the handheld scanner 400. When the identified aiming spot zone is identified by the handheld scanner 400 while the indicia decoder 112 is implemented by the host system only the image with the encoded tagline needs to be passed to the indicia decoder 112 of the host system. However, the one or more coordinates could be provided to the indicia decoder 112 separate from the image. Any additional images used by the imaging engine 414 to identify the aiming spot zone (e.g., as described below in connection with FIG. 6), for focusing, for gain or exposure determination, etc. are only needed and processed by the handheld scanner 400, and need not be passed to the host system implementing the indicia decoder 112. In this way, the amount of image data that is passed to the indicia decoder 112 of the host system can be substantially reduced, and overall responsiveness of a system including the handheld scanner 400 and the host system substantially increased.

The example imaging assembly 412 includes an optical assembly 416 having any number and/or type(s) of imaging optical components 418 to form images of objects in the FOV 106 on the surface of the image sensor 104. Example imaging optical components 418 include one or more lenses, filters, focus motors, apertures, lens holder, liquid lenses, or any other optical components.

The example imaging assembly 412 includes any number and/or type(s) of focus components 420 to focus the imaging assembly 412 on an object and/or indicia. Example focus components include motors, movable lenses, and liquid lenses. In some examples, the focus components 420 are controlled by the imaging engine 414. However, the focus components 420 may be controlled by the processor 402.

The example imaging assembly 412 includes the example aiming light source 118 and any number and/or type(s) of aiming optical components 422 to provide a clear illuminated aiming pattern in the FOV 106, such as the aiming light spot 120. The aiming light source 118 may include one or more light sources, such as lasers, LEDs, etc. Example aiming optical components 422 include one or more apertures, one or more diffractive, one or more refractive elements, etc.

The example imaging assembly 412 may include an illumination generator, not shown for clarity of illustration, to illuminate an indicia 126 to be imaged. The illumination generator may emit light in the FOV 106 to, for example, facilitate autofocusing and/or improve the quality of images captured by the image sensor 104.

In the implementation shown, the aiming light source 118 is positioned physically apart from the image sensor 104 and/or may be angled relative to the image sensor 104, such that an aiming light pattern (e.g., the aiming light spot 120) generated by the aiming light source 118 and the aiming optical components 422 along an optical axis 424 moves within the FOV 106 as the imaging assembly 412 or, more generally, a handheld scanner including the imaging assembly 412 is moved towards or away from an indicia, due to parallax. For example, an optical axis 426 of the image sensor 104 and the optical axis 424 of the aiming light source 118 may be separated by ten to fifteen millimeters. As a distance between the imaging assembly 412 or, more generally, a handheld scanner including the imaging assembly 412 and an indicia increases from a near distance 428 to a far distance 430, the aiming light pattern corresponding moves across the FOV 106 from a first location 432 near an edge of the FOV 106 to a second location 434 closer to a center of the FOV 106. Thus, a location of the aiming light pattern in the image data 105 can be detected and used to determine a focus distance, such that a handheld scanner including the imaging assembly 412 can be focused on the indicia.

When a user, as instructed, orients a handheld scanner including the imaging assembly 412 such that an aiming light pattern (e.g., the aiming light spot 120) falls incident on an indicia to be decoded, and then actuates the handheld scanner to capture image data 105 representing an image that includes the indicia, the detected location of the aiming light pattern in the image data 105 is also used by the indicia decoder 112 to select an initial region of the image data 105 in which the indicia decoder 112 initially searches for and attempts to decode the indicia. By thus detecting and using the location of the aiming light pattern in the image data 105 to locate the indicia, the time it takes the indicia decoder 112 to locate and decode the indicia can be substantially reduced and, under some circumstances, may prevent the indicia decoder 112 from failing to locate and decode the indicia.

The imaging engine 414 may be an ASIC or FPGA based processor. Alternatively, the imaging engine 414 may be one or more programmable microprocessors, controllers, and/or any suitable type of processor capable of executing machine-readable instructions. In some examples, the processor 402 implements the imaging engine 414.

In the implementation shown, the imaging engine 414 causes the image sensor 104 to capture first image data 105 containing an aiming light pattern, and second image data 105 not containing the aiming light pattern. The imaging engine 414 detects the aiming light pattern in the first image data 105 based on differences between the first and second image data 105, and identifies an aiming spot zone including the aiming light pattern, as described above in connection with FIGS. 1-3. The imaging engine 414: (i) determines a focus distance based on the identified aiming spot zone by, for example, querying the calibration table 134; (ii) controls the focus components 420 to focus the imaging assembly 412 at the determined focus distance; and (iii) causes the image sensor 104 to capture third image data 105 while focused at the determined focus distance. The imaging engine 414 provides to the processor 402 data representing the identified aiming spot zone, and/or one or more coordinates of the identified aiming spot zone. The processor 402 encodes one or more coordinates of the identified aiming spot zone in a tagline of an image 436 represented by the third image data 105, and provides the image 436 to the indicia decoder 112 for locating and decoding the indicia starting in a region of the third image data 105 corresponding to the identified aiming spot zone.

When an aiming light spot is not, thus, detected, the imaging engine 414 may sequentially attempt to decode an indicia using images captured for a finite sequence of fixed focus distances. At each focus distance, the imaging engine 414: (i) causes the focus components 420 to focus the imaging assembly 412 at the current focus distance; (ii) causes the image sensor 104 to capture image data 105 for the current focus distance; (iii) identifies a presumed aiming light zone in which an aiming light spot is presumed to be located based on the current focus distance and a parallax geometry between the aiming light source 118 and the image sensor 104; and (iii) provides to the processor 402 data representing the identified presumed aiming spot zone, and/or one or more coordinates of the identified presumed aiming spot zone. The presumed aiming spot zone for a current focus distance and parallax geometry can be determined by querying the calibration table 134 based on the current focus distance. The processor 402 encodes one or more coordinates of the identified presumed aiming spot zone in a tagline of an image 436 represented by the image data 105, and provides the image 436 to the indicia decoder 112 for locating and decoding the indicia starting in a region of the image data 105 corresponding to the identified presumed aiming spot zone.

Figure 5:
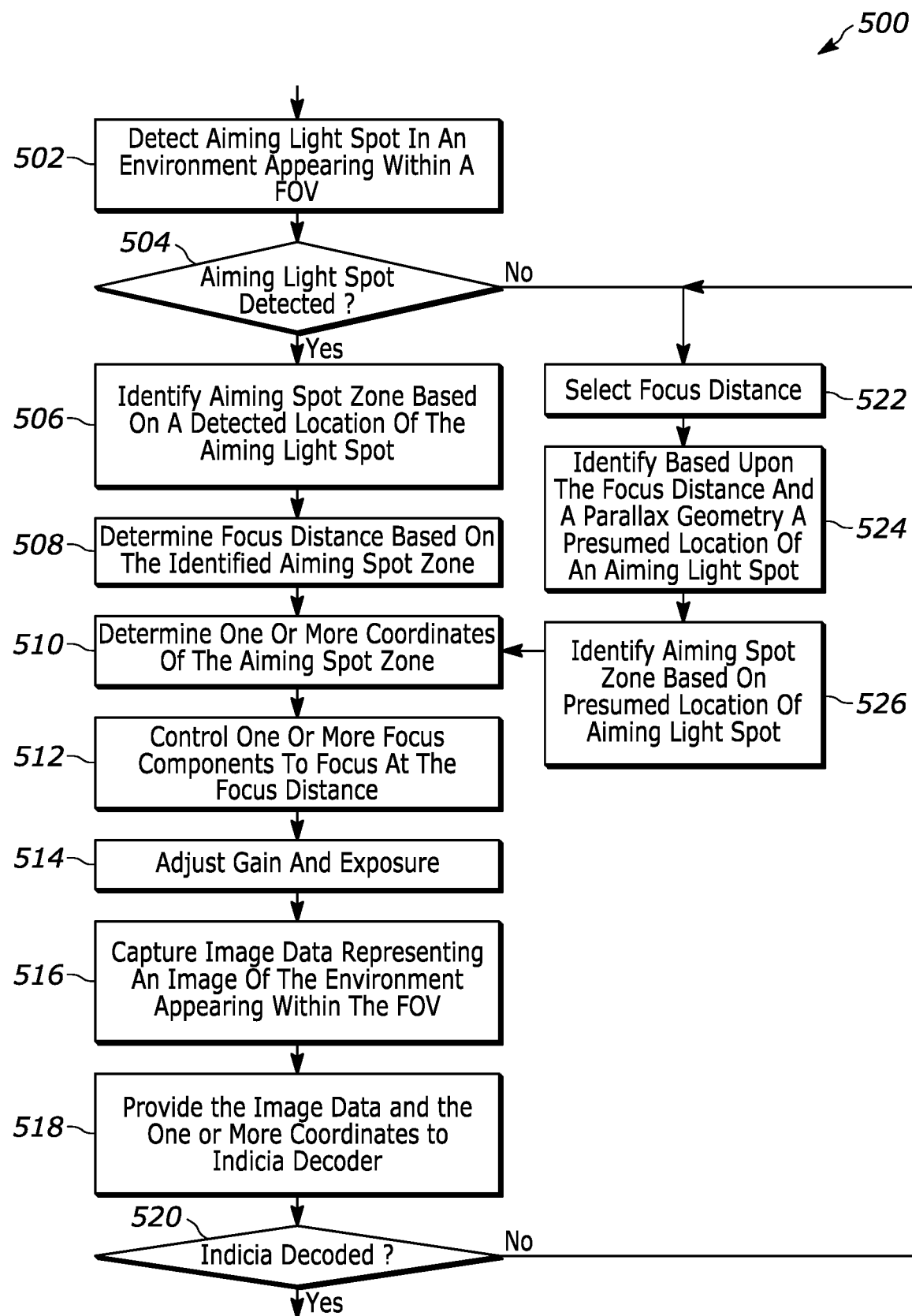
FIG. 5 is a flowchart representative of an example method, hardware logic, machine-readable instructions, or software for locating and decoding a small indicia in a large image, in accordance with embodiments of the disclosure.

FIG. 5 is a flowchart 500 representative of an example method, hardware logic, machine-readable instructions, or software for locating and decoding small indicia in large images, as disclosed herein. Any or all of the blocks of FIG. 5 may be an executable program or portion(s) of an executable program embodied in software and/or machine-readable instructions stored on a non-transitory, machine-readable storage medium for execution by one or more processors such as the imaging engine 414 and/or the processor 402 of FIG. 4. Additionally and/or alternatively, any or all of the blocks of FIG. 5 may be implemented by one or more hardware circuits structured to perform the corresponding operation(s) without executing software or instructions.

The flowchart 500 begins at block 502 with the imaging engine 414 and/or the processor 402 detecting an aiming light pattern appearing in an environment within a FOV. The aiming light pattern may be detected by implementing the example flowchart 600 of FIG. 6. Additionally and/or alternatively, the imaging engine 414 and/or the processor 402 may detect the aiming light pattern by applying one or more image processing algorithms to image data representing one or more images captured of an environment appearing within the FOV.

If an aiming light pattern is detected (block 504), the imaging engine 414 identifies an aiming spot zone corresponding to the detected aiming light pattern (block 506), and determines a focus distance based on the identified aiming spot zone using, for example, the calibration table 134 (block 508). The imaging engine 414 and/or the processor 402 determines one or more coordinates of the identified aiming spot zone (block 510). In some examples, the one or more coordinates of the identified aiming spot zone represent a center or a corner of the aiming spot zone. The imaging engine 414 causes the focus components 420 to focus the handheld scanner at the determined focus distance (block 512), adjusts gain and/or exposure based on, for example, captured image data 105 (block 514), and causes the image sensor 104 to capture image data 105 representing an image of an environment appearing within the FOV 106 for the focus distance, gain, and exposure (block 516).

The imagine engine 414 provides or sends the image data 105 and the one or more coordinates to the indicia decoder 112 to cause the indicia decoder 112 to attempt to decode an indicia from the image data 105 captured at block 516 starting in a region of the image data 105 selected based upon the one or more coordinates of the identified aiming spot zone (block 518). For example, the imaging engine 414 and/or the processor 402 encodes one or more coordinates of the identified aiming spot zone in the image data 105 into a tagline of an image 436 including the image data 105, and passes the image 436 to the indicia decoder 112 to cause the indicia decoder 112 to attempt to decode an indicia from the image data 105 starting in a region of the image data 105 selected based upon one or more coordinates of the identified aiming spot zone. In some examples, the dimensions of the region in which decoding starts are selected based upon an expected barcode size at a current focus distance, and the location of the region is selected to be centered on the identified aiming spot zone. If an indicia is decoded (block 520), control exits from the example flowchart 500.

Returning to block 504, if an aiming light pattern is not detected (block 504), the imaging engine 414 selects a focus distance from a plurality of fixed focus distances (block 522), identifies, based on the selected focus distances and a parallax geometry, a presumed aiming light pattern location if the aiming light pattern had been detected (block 524). For example, the imaging engine 414 queries the calibration table 134 based on the selected focus distance. The imaging engine 414 identifies an aiming spot zone corresponding to the identified presumed aiming light pattern location (block 526), and control proceeds to block 510 to attempt to decode an indicia from image data 105 captured at the selected focus distance. In some examples, the focus distance is selected based upon a pre-determined ramp of focus distances. In some examples, the focus distance is selected based upon a contrast measurement for captured image data 105.

Returning to block 520, if an indicia is not decoded (block 520), control returns to block 522 to select another focus distance of a plurality of fixed focus distances at which to try to decode an indicia. In some examples, the another focus distance is selected based upon the pre-determined ramp of focus distances.

Figure 6:
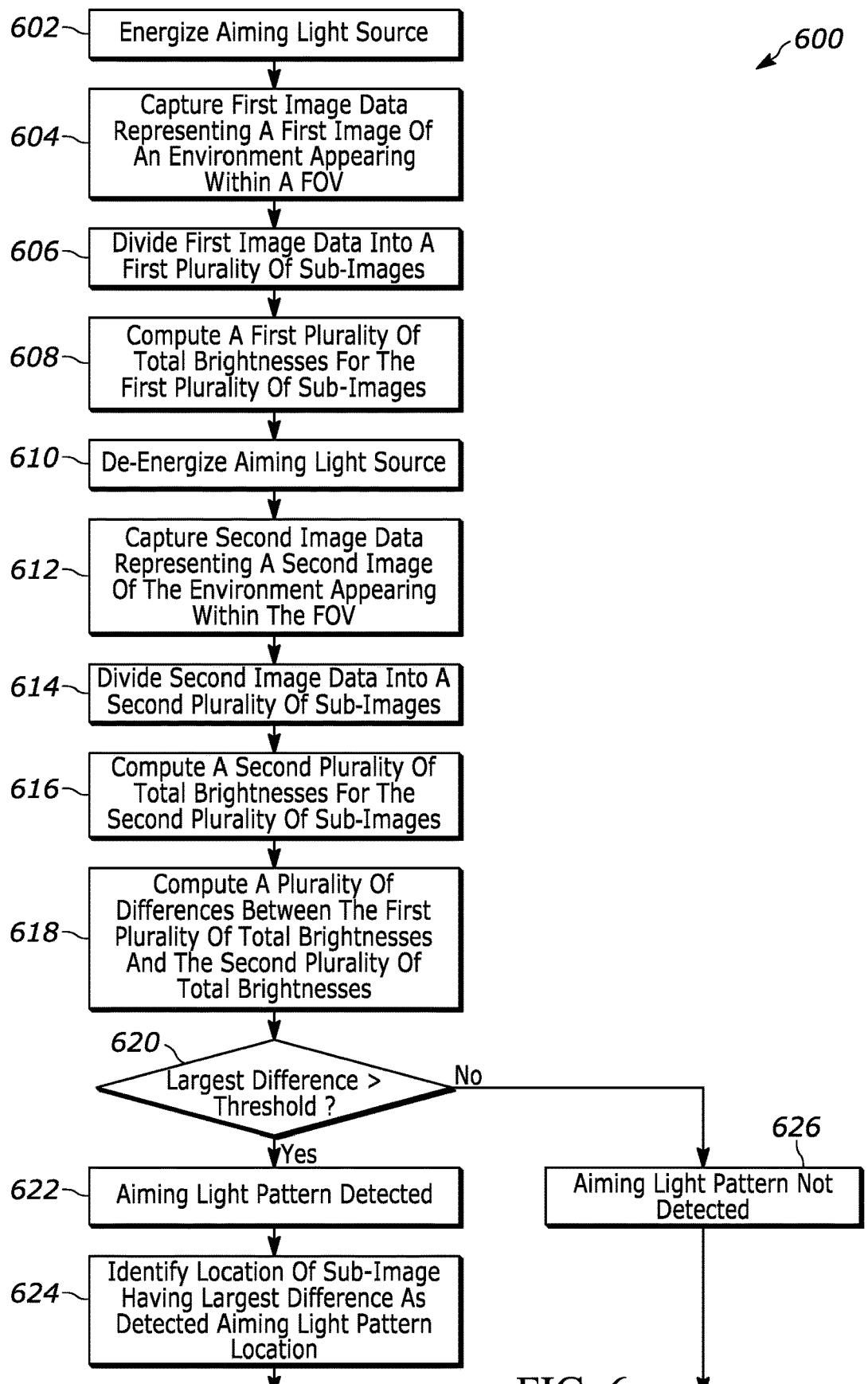
FIG. 6 is a flowchart representative of an example method, hardware logic, machine-readable instructions, or software for detecting an aiming light pattern, in accordance with embodiments of the disclosure.

FIG. 6 is a flowchart 600 representative of an example method, hardware logic, machine-readable instructions, or software for detecting an aiming light pattern appearing in an environment within a FOV, as disclosed herein. The flowchart 600 may be used to detect an aiming light pattern at, for example, block 508 of FIG. 5. Any or all of the blocks of FIG. 6 may be an executable program or portion(s) of an executable program embodied in software and/or machine-readable instructions stored on a non-transitory, machine-readable storage medium for execution by one or more processors such as the imaging engine 414 and/or the processor 402 of FIG. 4. Additionally and/or alternatively, any or all of the blocks of FIG. 6 may be implemented by one or more hardware circuits structured to perform the corresponding operation(s) without executing software or instructions.

The flowchart 600 begins at block 602 with the imaging engine 414 activating or energizing the aiming light source 118. The imaging engine 414 causes the image sensor 104 to capture first image data 105 representing a first image of an environment appearing within a FOV of a handheld scanner including the imaging engine 414 (block 604). In some examples, the first image data 105 represents a first partial image of only a portion of an environment appearing within the FOV, wherein the aiming light pattern moves within only the portion of the environment in response to a change in a distance from the handheld scanner to the indicia. The imaging engine 414 divides the first image data 105 into a first plurality of sub-images (block 606), and computes a first plurality of total brightnesses for respective ones of the first plurality of sub-images by summing together brightnesses of the first image data 105 for each sub-image (block 608).

The imaging engine 414 deactivates or de-energizes the aiming light source 118 (block 610), and causes the image sensor 104 to capture second image data 105 representing an image of an environment in the FOV 106 while the aiming light source 118 is inactive or de-energized (block 612). In some examples, the second image data 105 represents a second partial image of only the portion of an environment appearing within the FOV. The imaging engine 414 divides the second image data 105 into a second plurality of sub-images (block 614). The imaging engine 414 computes a second plurality of total brightnesses for respective ones of the second plurality of sub-images by summing together brightnesses of the second image data 105 for each sub-image (block 616).

The imaging engine 414 computes a plurality of differences between respective ones of the first plurality of total brightnesses and the second plurality of total brightnesses (block 618). If the largest difference of the plurality of differences satisfies a criteria (e.g., is greater than a threshold) (block 620), an aiming light pattern is detected (block 622), the location of sub-image having largest difference is identified as the detected location of the aiming light pattern (block 624), and control exits from the example flowchart 600.

Otherwise, if the largest difference of the plurality of differences does not satisfy the criteria (block 620), an aiming light pattern is not detected (block 626), and control exits from the example flowchart 600.

When only partial first and second images are used to detect the aiming light pattern, the partial first and second images can be captured at a higher frame rate than full images such that relative positions of a handheld scanner and an indicia to be decoded change very little between the two partial images. In this way, the accuracy of the detected location of the aiming light pattern is increased, and the likelihood that an indicia decoder can locate and decode the indicia based on the detected location of the aiming light pattern is also increased.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 4%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. A method for locating an indicia, the method comprising:
   identifying an aiming pattern zone that includes a detected or presumed location of an aiming light pattern, wherein an offset between the detected or presumed location of the aiming light pattern and a center of image data varies with a distance from a handheld scanner to the indicia due to a parallax;
   determining one or more coordinates of the aiming pattern zone;
   capturing, with an image sensor of the handheld scanner, image data representing an image of an environment appearing within a field of view (FOV) of the handheld scanner including the indicia;
   encoding the one or more coordinates of the aiming pattern zone into a tagline of the image; and
   providing the image with the tagline to an indicia decoder such that the indicia decoder attempts to decode the indicia from the image data starting in a region of the image data selected based upon the one or more coordinates of the aiming pattern zone.

2. The method of claim 1, wherein the one or more coordinates of the aiming pattern zone represent a location of a corner or a center of the aiming pattern zone.

3. The method of claim 1, further comprising:
   determining a focus distance based upon the identified aiming pattern zone; and
   controlling one or more focusing components to focus the handheld scanner at the focus distance, wherein the image data is captured while the handheld scanner is focused at the focus distance.

4. The method of claim 1, wherein identifying the aiming pattern zone includes:
   energizing an aiming light source to provide the aiming light pattern;
   capturing, with the image sensor while the aiming light source is energized, first image data representing a first partial image of only a portion of an environment appearing within the FOV, wherein the aiming light pattern moves within the portion of the environment in response to a change in a distance from the handheld scanner to the indicia;
   dividing the first image data into a first plurality of sub-images;
   totaling brightnesses of the first image data in each of the first plurality of sub-images to form a first plurality of total brightnesses for respective ones of the first plurality of sub-images;
   de-energizing the aiming light source;
   capturing, with the image sensor while the aiming light source is de-energized, second image data representing a second partial image of only a portion of an environment appearing within the FOV;
   dividing the second image data into a second plurality of sub-images;
   totaling brightnesses of the additional image data in each of the second plurality of sub-images to form a second plurality of total brightnesses for respective ones of the second plurality of sub-images;
   computing a plurality of differences between respective ones of the first plurality of total brightnesses and the second plurality of total brightnesses; and
   identifying a first sub-image of the first plurality of sub-images corresponding to a largest respective difference of the plurality of differences as the aiming pattern zone.

5. The method of claim 4, wherein the first sub-image is identified as the aiming pattern zone when the largest difference satisfies a criteria.

6. The method of claim 1, wherein identifying the aiming pattern zone includes:
   energizing an aiming light source to provide the aiming light pattern;
   capturing, with the image sensor while the aiming light source is energized, first image data representing a first image of the environment appearing within the FOV;
   applying one or more image processing algorithms to the first image data to detect the aiming light pattern; and
   identifying a zone of the first image data including the detected aiming light pattern as the aiming pattern zone.

7. The method of claim 1, wherein identifying the aiming pattern zone includes:
   determining a focus distance;
   controlling one or more focusing components to focus the handheld scanner at the focus distance, wherein the image data is captured while the handheld scanner is focused at the focus distance;
   identifying, based upon the focus distance and the parallax, the presumed location of the aiming light pattern; and
   identifying the aiming pattern zone to include the presumed location of the aiming light pattern.

8. The method of claim 7, wherein the focus distance is at least one of determined according to a pre-determined focus ramp.

9. The method of claim 7, wherein, when the indicia is not decodable in the image data:
   determining a second focus distance;
   controlling the one or more focusing components to focus the handheld scanner at the second focus distance;
   capturing, with the image sensor while handheld scanner is focused at the second focus distance, additional image data representing an additional image of the environment appearing within the FOV;
   identifying, based upon the second focus distance and the parallax, a second presumed location of the aiming light pattern;
   identifying a second aiming pattern zone based upon the second presumed location of the aiming light pattern;
   determining one or more coordinates of the second aiming pattern zone;
   encoding the one or more coordinates of the second aiming pattern zone into a tagline of the additional image; and
   providing the additional image to the indicia decoder such that the indicia decoder attempts to decode the indicia from the additional image data starting in a region of the additional image data selected based upon the one or more coordinates of the second aiming pattern zone.

10. A handheld scanner comprising:
    an image sensor;
    an aiming light source; and
    a processor configured to:
      identify an aiming pattern zone that includes a detected or presumed location of an aiming light pattern, wherein an offset between the detected or presumed location of the aiming light pattern and a center of the image data varies with a distance from the handheld scanner to an indicia due to a parallax;
      determine one or more coordinates of the aiming pattern zone;
      cause the image sensor to capture image data representing an image of an environment appearing within a field of view (FOV) of the handheld scanner that includes the indicia;
      encode the one or more coordinates of the aiming pattern zone into a tagline of the image; and
      provide the image with the tagline to an indicia decoder separate from the handheld scanner, wherein the indicia decoder is configured to, in response to receiving the image, attempt to decode the indicia from the image data starting in a region of the image data selected based upon the one or more coordinates of the aiming pattern zone encoded in the tagline.

11. The handheld scanner of claim 10, wherein the one or more coordinates of the aiming pattern zone represent a location of a corner or a center of the aiming pattern zone.

12. The handheld scanner of claim 10, further comprising one or more focusing component to focus the handheld scanner, wherein the processor is configured to:
    determine a focus distance based upon the identified aiming pattern zone; and
    control the one or more focusing components to focus the handheld scanner at the focus distance, wherein the image data is captured while the handheld scanner is focused at the focus distance.

13. The handheld scanner of claim 10, wherein the processor is configured to identify the aiming pattern zone by:
    energizing the aiming light source to provide the aiming light pattern;
    causing the image sensor to, while the aiming light source is energized, capture first image data representing a first partial image of only a portion of an environment appearing within the FOV, wherein the aiming light pattern moves within the portion of the environment in response to a change in a distance from the handheld scanner to the indicia;
    dividing the first image data into a first plurality of sub-images;
    totaling brightnesses of the first image data in each of the first plurality of sub-images to form a first plurality of total brightnesses for respective ones of the first plurality of sub-images;
    de-energizing the aiming light source;
    causing the image sensor to, while the aiming assembly is de-energized, capture second image data representing a second partial image of only a portion of an environment appearing within the FOV;
    dividing the additional image data into a second plurality of sub-images;
    totaling brightnesses of the additional image data in each of the second plurality of sub-images to form a second plurality of total brightnesses for respective ones of the second plurality of sub-images;
    computing a plurality of differences between respective ones of the first plurality of total brightnesses and the second plurality of total brightnesses; and
    identifying a first sub-image of the first plurality of sub-images corresponding to a largest respective difference of the plurality of differences as the aiming pattern zone.

14. The handheld scanner of claim 10, wherein the processor is configured to identify the aiming pattern zone by:
    determining a focus distance;
    identifying, based upon the focus distance and the parallax, the presumed location of the aiming light pattern; and
    identifying the aiming pattern zone to include the presumed location of the aiming light pattern.

15. The handheld scanner of claim 10, wherein the processor is configured to identify the aiming pattern zone by:
    energizing an aiming light source to provide the aiming light pattern;
    capturing, with the image sensor while the aiming light source is energized, first image data representing a first image of the environment appearing within the FOV;
    applying one or more image processing algorithms to the first image data to detect the aiming light pattern; and
    identifying a zone of the first image data including the detected aiming light pattern as the aiming pattern zone.

16. A non-transitory, computer-readable, storage medium storing computer-readable instructions that, when executed by one or more processors, cause a handheld scanner to:
  identify an aiming pattern zone that includes a detected or a presumed location of an aiming light pattern, wherein an offset between the detected or presumed location of the aiming light pattern and a center of image data varies with a distance from the handheld scanner to an indicia due to a parallax;
  determine one or more coordinates of the aiming pattern zone;
  cause the image sensor to capture image data representing an image of an environment appearing within a field of view (FOV) of the handheld scanner that includes the indicia;
  encode the one or more coordinates of the aiming pattern zone into a tagline of the image; and
  provide the image with the tagline to an indicia decoder separate from the handheld scanner to cause the indicia decoder to attempt to decode the indicia from the image data starting in a region of the image data selected based upon the one or more coordinates of the aiming pattern zone.

17. The storage medium of claim 16, wherein the one or more coordinates of the aiming pattern zone represent a location of a corner or a center of the aiming pattern zone.

18. The storage medium of claim 16, wherein the instructions, when executed by the one or more processors, cause the handheld scanner to:
  determine a focus distance based upon the identified aiming pattern zone; and
  control one or more focusing components to focus the handheld scanner at the focus distance, wherein the image data is captured while the handheld scanner is focused at the focus distance.

19. The storage medium of claim 16, wherein the instructions, when executed by the one or more processors, cause the handheld scanner to identify the aiming pattern zone by:
  energizing an aiming light source to provide the aiming light pattern;
  cause the image sensor to, while the aiming light source is energized, capture first image data representing a first partial image of only a portion of an environment appearing within the FOV, and wherein the aiming light pattern moves within the portion of the environment in response to a change in a distance from the handheld scanner to the indicia;
  dividing the first image data into a first plurality of sub-images;
  totaling brightnesses of the first image data in each of the first plurality of sub-images to form a first plurality of total brightnesses for respective ones of the first plurality of sub-images;
  de-energizing the aiming light source;
  cause the image sensor to capture, while the aiming assembly is de-energized, second image data representing a second partial image of only a portion of an environment appearing within the FOV;
  dividing the second image data into a second plurality of sub-images;
  totaling brightnesses of the second image data in each of the second plurality of sub-images to form a second plurality of total brightnesses for respective ones of the second plurality of sub-images;
  computing a plurality of differences between respective ones of the first plurality of total brightnesses and the second plurality of total brightnesses; and
  identifying a first sub-image of the first plurality of sub-images corresponding to a largest respective difference of the plurality of differences as the aiming pattern zone.

20. The storage medium of claim 16, wherein the instructions, when executed by the one or more processors, cause the handheld scanner to identify the aiming pattern zone by:
  determining a focus distance;
  identifying, based upon the focus distance and the parallax, the presumed location of the aiming light pattern; and
  identifying the aiming pattern zone to include the presumed location of the aiming light pattern.

21. The storage medium of claim 16, wherein the instructions, when executed by the one or more processors, cause the handheld scanner to identify the aiming pattern zone by:
  energizing an aiming light source to provide the aiming light pattern;
  capturing, with the image sensor while the aiming light source is energized, first image data representing a first image of the environment appearing within the FOV;
  applying one or more image processing algorithms to the first image data to detect the aiming light pattern; and
  identifying a zone of the first image data including the detected aiming light pattern as the aiming pattern zone.

* * * * *